Feb. 11, 1930.  J. M. BERRY  1,746,299
ELECTRIC WIRE CASING
Filed Feb. 25, 1924
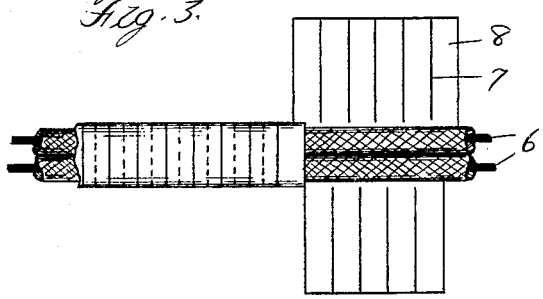
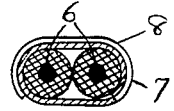
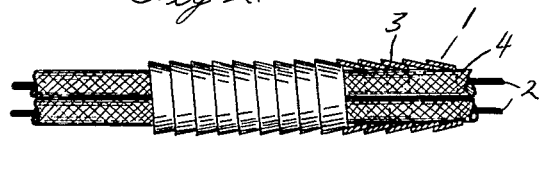
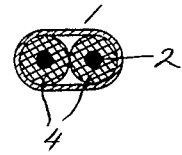
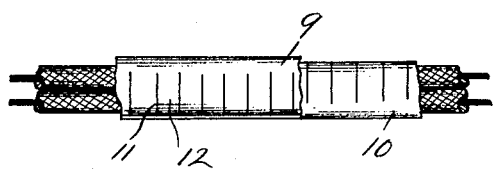
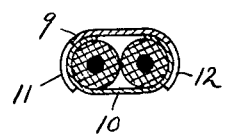
Inventor
James M. Berry Patented Feb. 11, 1930

1,746,299

UNITED STATES PATENT OFFICE

JAMES M. BERRY, OF DETROIT, MICHIGAN

ELECTRIC-WIRE CASING

Application filed February 25, 1924. Serial No. 695,131.

The invention relates to electric wiring structures and has among its objects the provision of a casing for an electric wire which completely incloses the same and forms a unit therewith; the provision of a pliable unit including both the casing and the wire; and the provision of a unit which may be safely handled and which can be manufactured at a relatively low cost. Further objects of the invention reside in the novel features of construction and combinations and arrangements of parts as more fully hereinafter set forth.

In the drawings:

Figure 1 is a plan view, partly in section, of a portion of an electric wiring structure embodying my invention;

Figure 2 is a cross section therethrough;

Figure 3 is a view similar to Figure 1 showing a modified construction;

Figure 4 is a cross section therethrough;

Figure 5 is a view similar to Figure 1 showing another modified construction;

Figure 6 is a cross section therethrough.

1 is a pliable casing for a plurality of pliable insulated electric wires 2. This casing completely incloses the wires to protect the same from moisture as well as wear, and as shown in Figures 1 and 2 is formed of a metallic ribbon which is spirally wound around the wires and adjacent convolutions of which overlap. The casing forms a unit with the wires and has a substantially oval-shaped cross section, as shown particularly in Figure 2. To hold the wires from relative movement the inner edges of the convolutions form shoulders 3 which indent slightly into the insulation 4 of the wires. This unit may be readily manufactured at a relatively low cost in an automatic machine which will coil the ribbon forming the casing firmly around the wires in a continuous operation. Also, this unit being pliable may be readily wound upon a reel and carried in stock in this manner.

As shown in Figures 3 and 4, 5 is the pliable casing which is preferably formed of metal and which completely incloses the pliable insulated electric wires 6. This casing is formed of a strip having its opposite edges transversely slit at 7 to form tongues 8. These transverse slits are staggered, and as a consequence, when the tongues are return bent around the wires with those at one edge outside those at the other edge, the outer tongues extend over the slits formed between the inner tongues. This casing may be formed in an automatic machine which will produce the staggered transverse slits in the opposite edges of the strip and will then return bend the tongues with those at one edge beneath those at the other edge to firmly engage the electric wires and form a pliable unit therewith.

In the modification shown in Figures 5 and 6, the pliable casing comprises the cooperating strips 9 and 10 each of which is substantially U-shaped and has at its edges the transverse slits 11 forming the tongues 12. The strip 10 is nested within the strip 9 and opens toward the same, and the inner strip is positioned relative to the outer strip such that the transverse slits are staggered and as a consequence the slits of the inner strip are covered by the outer strip. These two strips firmly embrace the pliable insulated electric wires and are adapted to form a unit therewith.

It will be readily seen that the above electric wiring structures are pliable and may be wound upon reels upon leaving the automatic machines. It will also be seen that the casing in each instance forms a unit with the electric wires and completely surrounds the same to protect the wires from moisture as well as wear.

What I claim as my invention is:

1. In an electric wiring structure, a casing for an electric wire, said casing including a strip having its opposite edges transversely slit to form tongues, said tongues being bent to embrace the wire, those of one side transversely and longitudinally overlapping those of the opposite side.

2. In an electric wiring structure for enclosing an electric wire of a pliable character, a casing formed of a strip of material of a pliable character, said strip of material having its opposite longitudinal edges transversely slit, the slits along one edge being arranged in staggered relation to those along the opposite edge to form a series of tongues along said edges of the strip, said tongues adapted to be return-bent to enclose said wire.

3. In an electric wiring structure for enclosing an electric wire of a pliable character, a casing formed of a strip of material of a pliable character, said strip being provided along each of its opposite longitudinal edges with a series of relatively offset tongues adapted to be return-bent to form a casing for completely enclosing said wire, the tongues of one of said series adapted to overlie the tongues of the other series.

4. In an electric wiring structure for enclosing an electric wire of a pliable character, a casing formed of a strip of material of a pliable character, said strip being slit along its opposite longitudinal edges to form two series of tongues, the said tongues adapted to render the casing pliable and to be return-bent and transversely overlapped to enclose said wire.

5. In an electric wiring structure for enclosing an electric wire of a pliable character, a casing formed of a strip of material of a pliable character, said strip being slit along its opposite longitudinal edges to form two series of relatively offset tongues, the successive tongues of each series being directly adjacent each other, said tongues adapted to be return-bent to enclose said wire.

6. In an electric wiring structure for enclosing an electric wire of a pliable character, a casing formed of a strip of material of a pliable character, said strip being slit along its opposite longitudinal edges to form two series of relatively offset tongues, the successive tongues of each series being directly adjacent each other, said tongues adapted to be return-bent to enclose said wire, the tongues of one of said series adapted to overlie those of the other series.

7. In an electric wiring structure, for enclosing an electric wire of a pliable character, a casing of a strip of material of a pliable character, said strip having longitudinal extending edges return-bent transversely of the strip to enclose said wire, and means for rendering said casing capable of being readily flexed without exposing the wire.

8. A flexible casing for an electric wire including a plurality of tongues bent to completely enclose the wire, the said tongues being transversely and longitudinally overlapped so as to permit flexing of the wire and casing without exposing the wire.

9. In an electric wire structure, a strip having a plurality of transversely and longitudinally overlapping return-bent tongues for enclosing an electric wire.

10. A flexible casing for an electric wire comprising a strip of pliable material having its opposite longitudinal edges provided with tongues, the tongues at one edge being arranged in staggered relation to those along the opposite edge, said tongues adapted to be bent to overlap transversely and longitudinally to completely enclose said wire.

In testimony whereof I affix my signature.

JAMES M. BERRY.